US005285375A

United States Patent [19]

Kim

[11] Patent Number: 5,285,375

[45] Date of Patent: Feb. 8, 1994

[54] CONTROL APPARATUS AND CONTROL METHOD OF A WASHING MACHINE

[75] Inventor: Yong Man Kim, Suwon, Rep. of Korea

[73] Assignee: Samsung Electronics Co., Ltd., Suwon, Rep. of Korea

[21] Appl. No.: 877,073

[22] Filed: May 1, 1992

[30] Foreign Application Priority Data

May 9, 1991 [KR] Rep. of Korea .................... 91-7498

[51] Int. Cl.[5] .................... G05B 11/01; G05B 9/02; H04B 1/06

[52] U.S. Cl. .................... 364/140; 364/146; 364/185; 455/353

[58] Field of Search .............. 364/140, 146, 188, 189, 364/185; 455/353

[56] References Cited

U.S. PATENT DOCUMENTS 4,301,542 11/1981 Weintraub et al. ................ 455/353
4,916,613 4/1990 Lange et al. ................ 364/400
4,999,763 3/1991 Ousborne ................ 364/140
5,086,385 2/1992 Launey et al. ................ 364/188

FOREIGN PATENT DOCUMENTS 2-55088 2/1990 Japan .

*Primary Examiner*—Jerry Smith
*Assistant Examiner*—Paul Gordon
*Attorney, Agent, or Firm*—Burns, Doane, Swecker & Mathis

[57] ABSTRACT

The present invention relates to a control method and a control apparatus of a washer wherein washing processes involving washing, rinsing and de-watering are performed fully automatically by the introduction of functions of a commonly-used remote controller, thus providing the user conveniences and usefulness, and more particularly to a control method and a control apparatus of a washer wherein, by utilizing a remote controller and a radio transmitting and receiving part internally installed on the main body of the washer, necessary data are mutually transmitted and received and when there is any discrepancy, the user is caused to perceive it through an alarm part and a display part of a remote controller, which makes swift action possible and prevents abnormal operations of a washer resulting from mutual interference by way of proceeding washing process only when intrinsic secret codes of a washer are matched with secret codes memorized in a EEPROM.

7 Claims, 6 Drawing Sheets

CONTROL APPARATUS AND CONTROL METHOD OF A WASHING MACHINE

FIELD OF THE INVENTION

The present invention relates to a washing machine (hereinafter called "washer"), which performs washing processes automatically including washing, rinsing and de-watering and, more particularly, the present invention relates to a control apparatus and control method for a washer which provides convenience and usefulness to a user by employing the functions of a remote controller (hereinafter called "remocon").

DESCRIPTION OF RELATED ART

In general, in a conventional infra-red remocon such as illustrated in FIG. 1, a pulse signal is output from signal generating integrated element if a key on a keyboard 50 is pressed. This pulse signal causes a Zenor diode ZDI to have electric potential through a resistor R1. This signal is input to the base of a transistor Q2 as bias voltage, causing the transistor Q2 to turn on, and thereby turning on the transistor Q1.

However, because the electric power source of battery B1 has been already charged into a condenser C2 through a diode D1 before the pulse signal is output from the signal generating integrated element 51, and if the transistor Q1 is turned on, the battery B1, the diode D1, and the condenser C2 are connected in series. This causes the electric power to be added by a charging voltage of the condenser C2, and thereby to be added to the anode of light emitting diode LED 1 and infra-red diodes LED 2 through LED 4. At this point, as the emitter output voltage of the transistor Q2 turns on transistors Q3, Q4 through a resistor R5, light emitting diode LED 1 and infra-red diodes LED 2 through LED 4 are driven to emit light.

However, the conventional remocon thus constructed has a problem in that the generating signal can be attenuated by distance and disturbances, which restricts the place and the range of where it can be used, due to characteristics of infra-red light. This causes the remocon to be controllable at a distance which is within a visible range. Additionally, the sensitivity of the remocon deteriorates perhaps resulting in the inoperativeness of the remocon under high intensity light beams or brightness from, e.g., the sun due to interference of noise in the sensor. Furthermore, there has been difficulty in adjusting transmitting frequencies on the part of the infra-red transmitting frequency, which causes many problems in controlling at a distance.

To solve these kind of problems, Japanese Laid-Open Application No. HEISEI 2-55088 describes and illustrates a washer machine control method. This washer control method, as illustrated in FIG. 2, comprises an operating means 53 controlling the load driving of motors and the like; first and second input-output means 54, 55 setting and indicating the settings of the washing method; first and second transmitting-receiving means 56, 57; and a control means 58 controlling, the first and second input-output means 54, 55, the transmitting-receiving means 56, 57 and the operating means 53.

In this washer control method, the operating means 53, the second input-output means 55, the second transmitting-receiving means 57 and the control means 58 are installed onto the main body 59 of a washer, while the first input-output means 54 and the first transmitting-receiving means 56 are mounted onto the remocon control means 60, being separate from the main body of the washer.

Also in this washer control method, the operating means 53 and the second input-output means 55 are directly connected with the control means 58, and the first input-output means 54 is connected with the first transmitting-receiving means 56.

Accordingly, the first transmitting-receiving means 56 and the second transmitting-receiving means 57 perform the transmitting and receiving functions by wired or by wireless connection, meanwhile the second transmitting-receiving means 57 is so constructed to be connected with the control means 58 so that the user can check the proceeding status of a washer or can change the washing processes even though the user is far away from the washer.

However, this kind of conventional method can control only the driving of a washer by using the control part of a remocon, and when there is any discrepancy in the operation of the washer, it is impossible for the user remote from the washer to perceive the discrepancy, thus resulting in delay of washing time, an increase of electric power consumption and the degradation of the reliability of the washer due to wrong operation.

Besides, as intrinsic secret codes have not been provided to the respective washers, problems of generating abnormal operation of the washers resulting from mutual interference have occurred.

Accordingly, the present invention is provided in consideration of numerous conventional disadvantages, and thus it is the object of the present invention to provide a control apparatus and control method of a washer wherein the control of washing process can be implemented by using a remocon equipped with transmitting and receiving apparatus.

It is another object of the present invention to provide a control apparatus and control method of a washer wherein intrinsic secret codes are given to respective washers by using the memory elements of EEPROM (Electrically erasable programmable read only memory), resulting in the prevention of the abnormal operation coming from the mutual interference.

In order to achieve the object of the present invention, the control apparatus of a washer in accordance with the present invention comprises:

first and second micro computers;

first and second key parts which input the necessary data for operating a washer main body and operating a remocon into the first and second microcomputers;

first and second display parts which indicate the washing process status and its time according to the first and second microcomputers;

an alarm part which gives forth a warning sound in case there arise abnormal conditions during the washing processes;

first and second EEPROM's which memorize secret codes established for respective washers;

first and second radio transmitting parts which modulate the digital data coming from the first and second microcomputers into radio frequencies (RF) and thereafter radiate them; and power source adjusting part which controllingly turns on and off the power sources flowing to the second radio transmitting part and the second receiving part.

It is a further object of the present invention to provide the control method of the washer comprising:

a first step which turns off the power sources of the second radio transmitting-receiving part;

a second step which reads the secret codes coming from the second EEPROM;

a third step which receives the start code from the remocon;

a fourth step which transmits the situation codes to the remocon for receiving, once the start code from the remocon is received at the washer main body;

a fifth step which drives the power source adjusting part of the remocon, a second display part and an alarm part;

a sixth step which causes the washer main body to receive by transmitting key codes from the remocon;

a seventh step which discriminates whether or not the radio frequencies mutually transmitted/received between the remocon and the washer main body are identical, and which receives the key codes only when they are synchronized;

an eighth step which transmits, from the washer main body to the remocon, the information generated according to the operation of the washer; and a ninth step which indicates operation status of the washer and time and the like.

Other aspects and advantages of the present invention will become apparent from the following description of the preferred embodiment, taken in conjunction with the accompanying drawings, which disclose, by way of example, the principles of the invention.

DETAILED DESCRIPTION OF THE PREFERRED EMBODIMENTS

Figure 1:
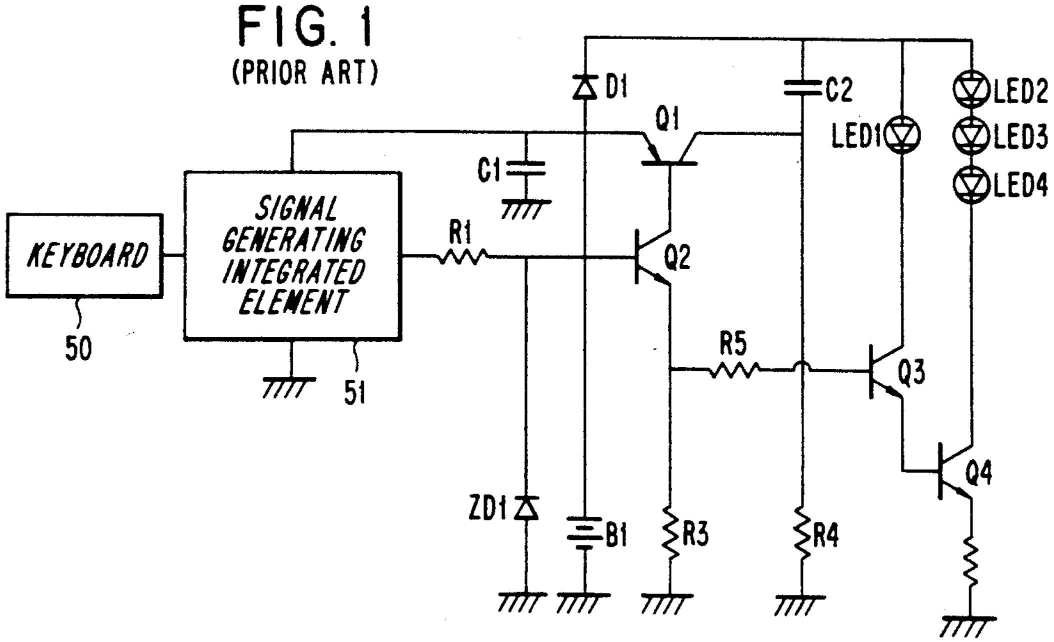
FIG. 1 (PRIOR ART)
FIG. 1 illustrates a conventional infra-red remocon.
Figure 2:
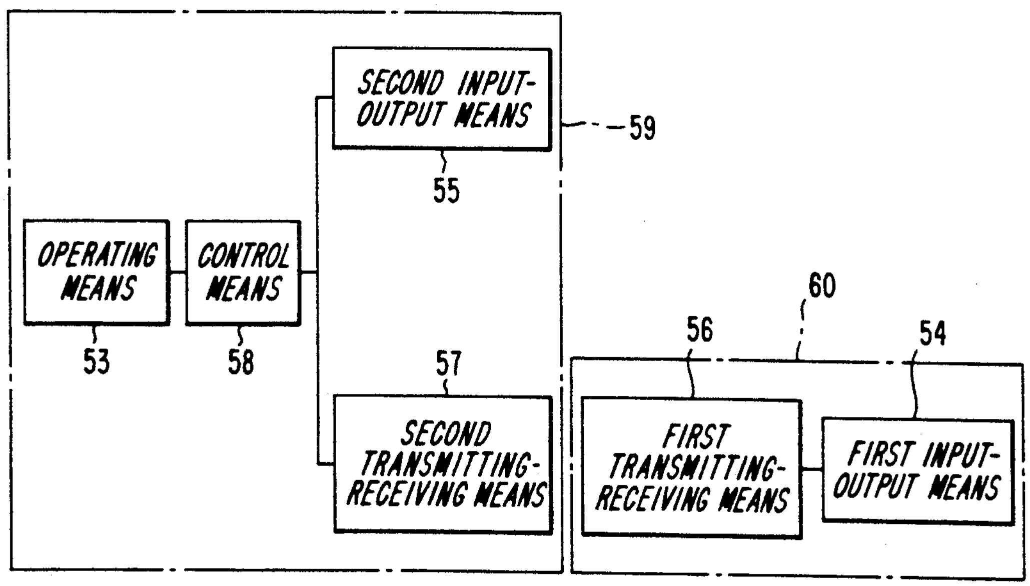
FIG. 2 (PRIOR ART)
FIG. 2 illustrates a conventional washer control method.
Figure 3:
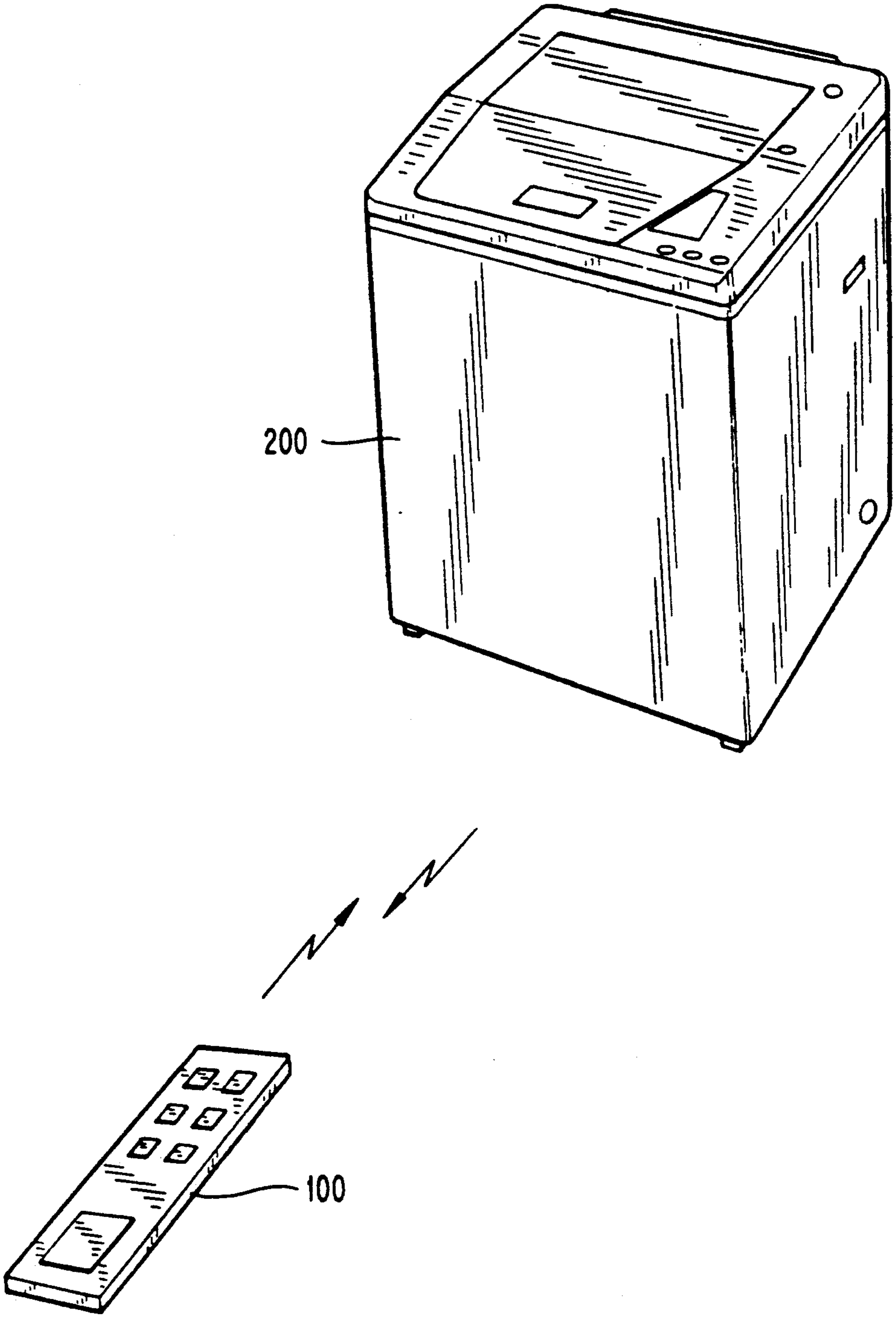
FIG. 3 is a correlational drawing of one embodiment between a washer and a remocon in accordance with the present invention.
Figure 4:
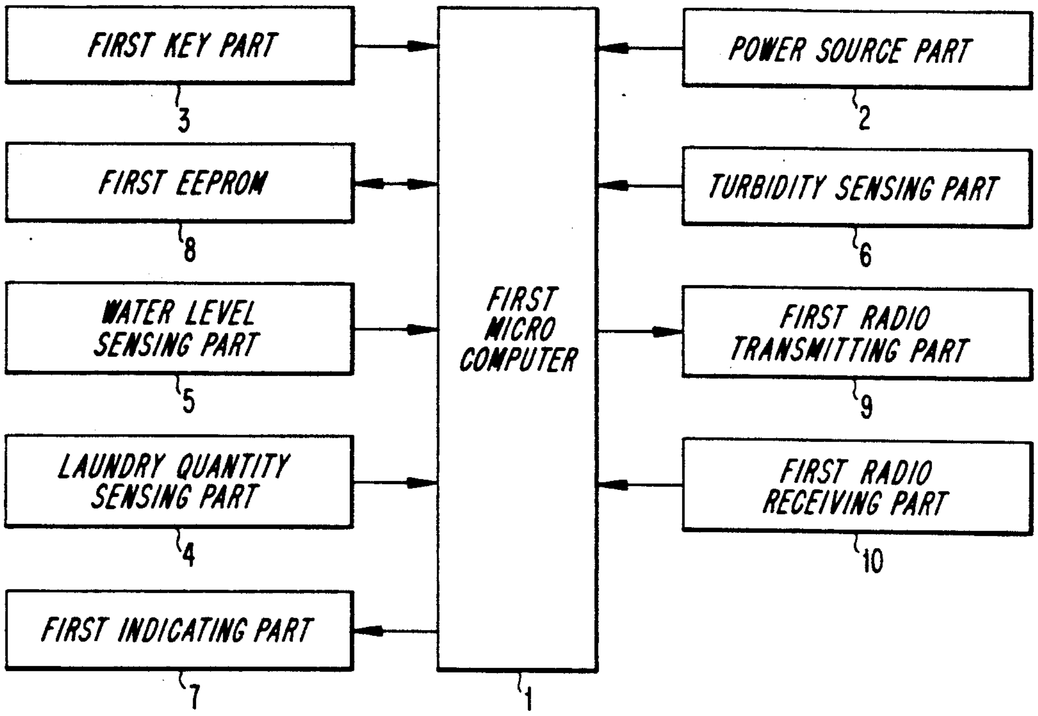
FIG. 4 is a block diagram of an apparatus installed inside the washer main body in accordance with the present invention.

In FIG. 4, (1) is a first microcomputer, (2) is a power source, (3) is a first key part which inputs the data used by the user for driving/controlling the motor and the like into the first microcomputer, (4) is a laundry quantity sensor which senses the laundry quantity in the washer tub, (5) is a water level sensor which sences whether or not an adequate water quantity according to the laundry quantity sensed by the laundry quantity sensor (4) has been poured, and (6) is a turbidity sensor which senses the turbidity degree of the laundry thrown into the washer tub. Element (7) is a first display part which indicates the washing process status, (8) is a first EEPROM, a memory element which memorizes data necessary for washing process and intrinsic secret codes of the washer, (9) is a first radio transmitting part which transmits the washing process status and the like to the remocon 100, and (10) is a first radio receiving part which receives the signals from the remocon 100.

Figure 5:
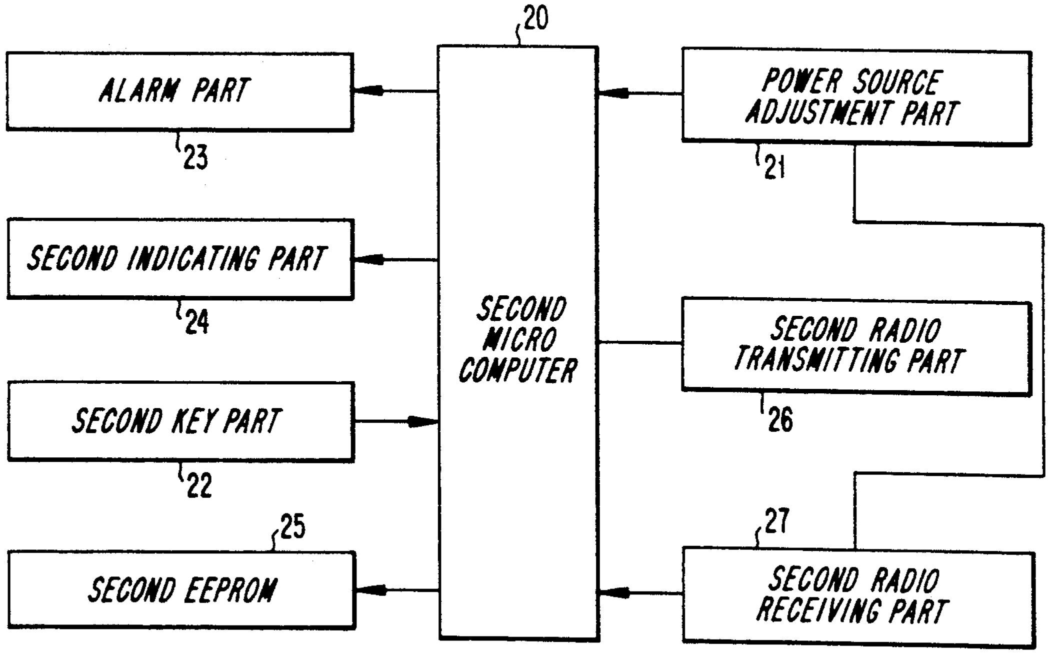
FIG. 5 is a block diagram of a remocon apparatus applied to the present invention.

In FIG. 5, (20) is a second microcomputer, (21) is a power source adjusting part which can turn on or off power whenever it is necessary for the user to minimize the power consumed in the remocon, and (22) is a second key part for operating the washer main body 200 or for operating the functions of the remocon itself. Element (23) is an alarm part which gives off a warning sound to allow the user to easily perceive and take immediate action when any discrepancies arise in the washer main body 200 during washing processing. Element (24) is a second display part which allows the user to easily perceive the washing process status and time, (25) is a second EEPROM, a memory element which memorizes the secret codes and other memorable information for mutual communication with the washer main body 200. Element (26) is a second radio transmitting part for transmitting over long distances the data generated by the microcomputer 20, and (27) is a second radio receiving part which receives the signals transmitted from the washer main body 200.

The apparatus and method in accordance with the present invention enables a remocon 100 and a washer main body 200 to mutually communicate by providing radio transmitting-receiving functions to a washer main body 200 as well as to the remocon, which makes the operation of the washer main body 200 possible by using the remocon 100 even at a distance and allows the user to learn the operation status of the washer main body 200 as well.

In other words, during the time washer is performing its original functions with respective sensors 4, 5, 6, sensing the washing process status and transmitting situation codes to remocon 100 by wireless means through the first radio transmitting part 9, the remocon 100 receives the situation codes transmitted from the washer at the second radio receiving part 27, while the microcomputer 20 installed inside the remocon 100, in connection with the received data, indicates the present status of the washer through the second display part 24, so that the user can check the present status.

Of course, in case there arise important matters which necessitate stopping the operation of the washer due to the status confirmed through the second display part 24, washer function halt signals are input by way of the operation of the second key part 22 installed in the remocon itself, so that the first radio receiving part 10 of the washer main body 200 receives the data by way of the second radio transmitting part 26 and thus performs the halting operation of the washer or the like.

Further detailed explanation can be given as follows: First of all, the user inputs the washing method by way of the first key part 3 installed onto the washer main body 200 or by way of the second key part 22 installed onto the remocon 100 separated from the washer main body 200.

The input status is shown through the first display part 7 of the washer main body 200 and the second display part 24 of remocon 100, which can be made p the user to recognize.

Of course, if the contents indicated in the first and the second display parts 7, 24 are different from the user's intentions, the contents are corrected through the first and the second key parts 3, 22 again, and if not, a start button (not shown) is pressed, and the motor of the washer is driven for the washing process. At this point, direct data transmission with the first microcomputer 1 is established at the first key part 3 and the first display part 7 installed on the washer main body 200. The data signals input by the operation of the second key part 22 mounted onto the remocon 100 are transmitted/-received, first of all, from the second radio transmitting part 26 to the first radio receiving part 10 installed inside the washer main body 200 by wireless method.

Of course, direct data transmission between the second radio transmitting part 26, the second radio receiving part 27 and the second microcomputer 20 is performed.

In the meantime, the first radio transmitting part 9 of the washer main body 200 and the second radio transmitting part 26 of remocon 100 perform the modulation for transmitting the data generated respectively from the first and second microcomputers 1, 20 to the washer main body 200 remotely located or to first and second radio receiving part 10, 27 of the remocon.

Figure 6:
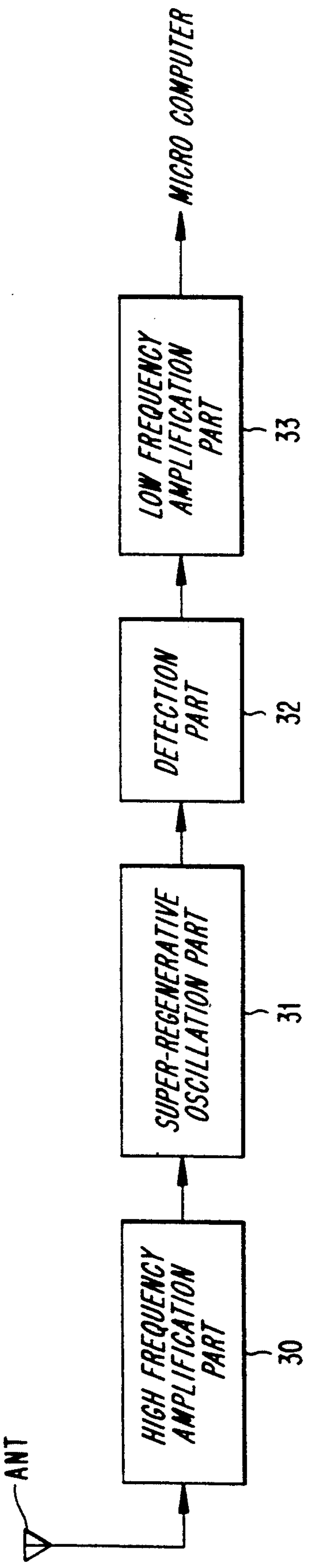
FIG. 6 is a detailed block diagram of the radio receiving part applied to the present invention.

Furthermore, the first and second radio receiving parts 10, 27 of the washer main body 200 and the remocon 100 respectively perform the demodulation for the first and second microcomputers 1, 20 respectively to judge correctly the modulation data transmitted from of the first and second radio transmitting parts 9, 26 of the washer main body 100 and remocon 100, respectively. As illustrated in FIG. 6, after all the RF components input from the antenna (ANT) are amplified at the high frequency amplification part 30, the signals only corresponding to the frequencies set at the super regenerative oscillation part 31 are passed through the detection part 30. The passed low frequency components (the real data) only are amplified at the low frequency amplification part 33 and are transformed to the digital data which can be perceived by the first and second microcomputers 1, 20, and then, are input into the first and second microcomputers 1, 20.

In other words, the user's recognition is possible as the digital data is displayed on the first and second display parts 7, 24 by the instructions of the first and second microcomputers 1, 20.

Figure 7A:
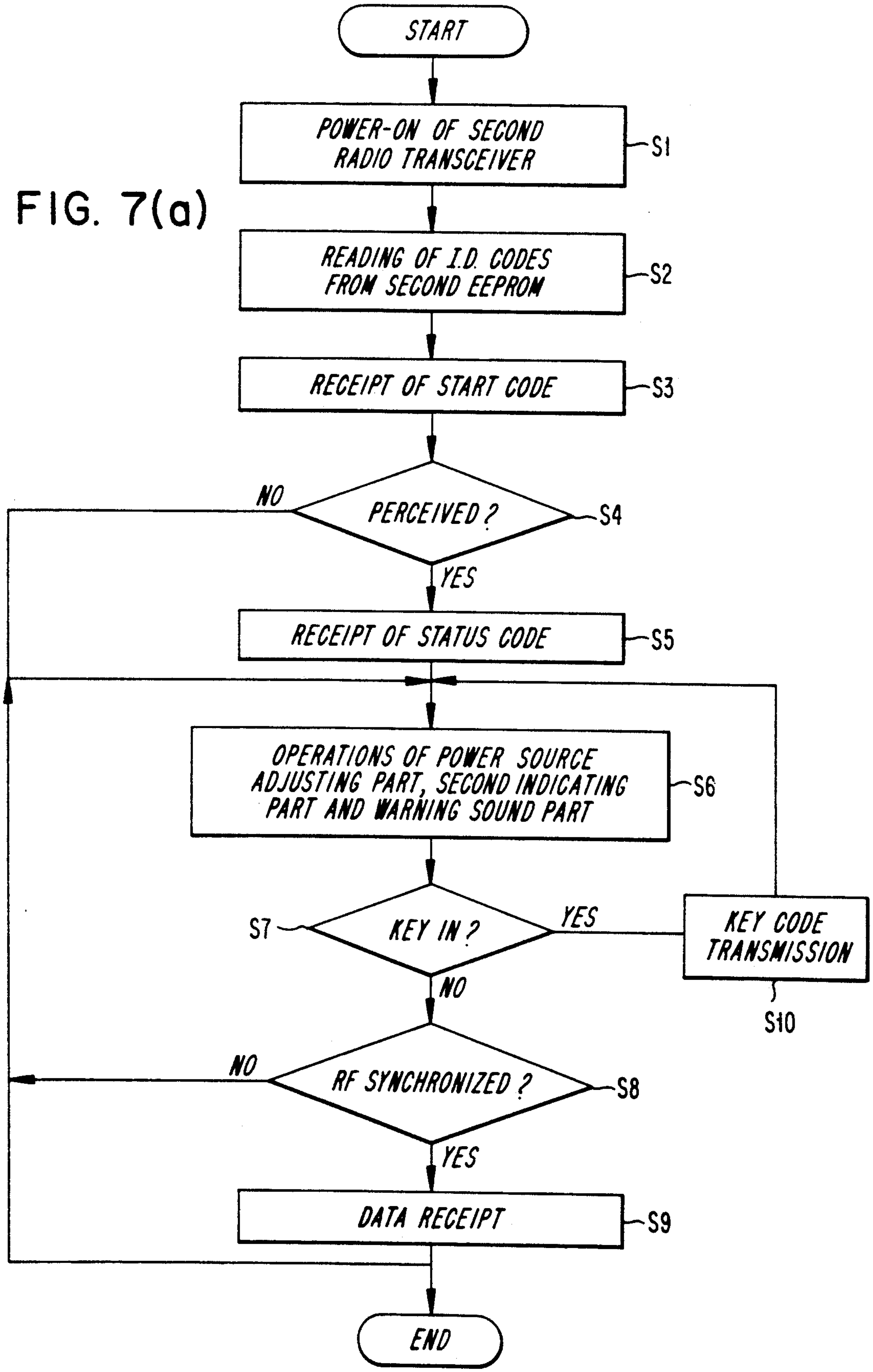
FIGS. 7*a* and 7*b* are flow charts illustrating the operating procedures according to the present invention.
Figure 7B:
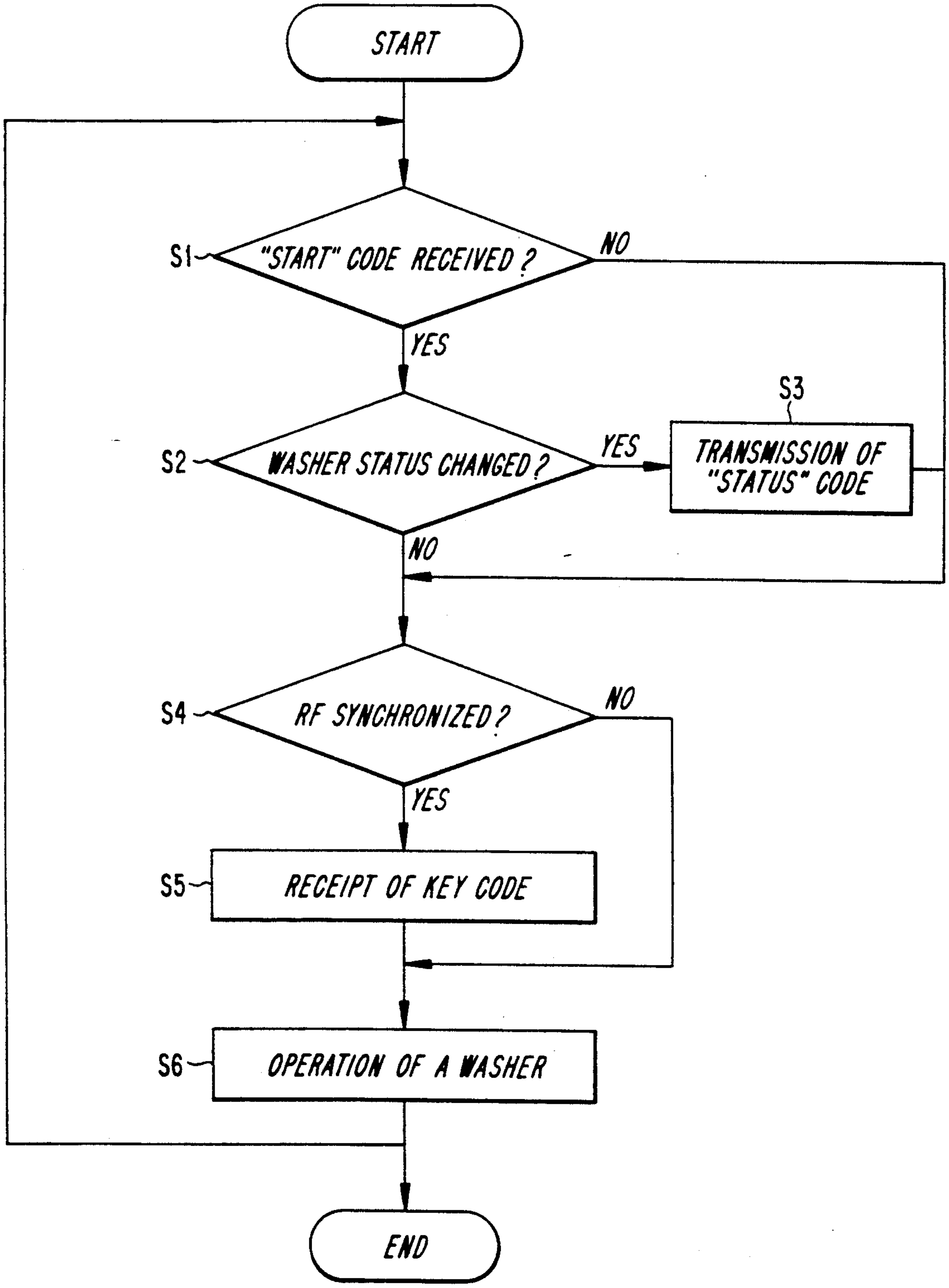

The following are the explanations of FIGS. 7*a* and 7*b*.

FIG. 7*a* is a flow chart illustrating the operation order for the radio transmitting part of a remocon in accordance with the present invention.

The control method of a washer in accordance with the present invention is, first of all, at step S1, to turn on and off controllingly the power sources to the second radio transmitting part 26 and the second radio receiving part 27 to minimize the life time of the battery used for the remocon, and then at step S2, for the second microcomputer 25 to read ID codes which are the secret codes memorized in the second EEPROM 25.

In succession, the program proceeds to step S3, and inputs the start codes on the second microcomputer 21 through the second key part 22 for the start codes to be transmitted by the second radio transmitting part 26. Then, the start codes are transmitted by the second transmitting part and are received by the first radio receiving part 10 of the washer main body 200.

In due succession, step S4 judges whether or not the first radio receiving part 10 has received the start codes, and based upon the judgement, if the start codes are received by the first radio receiving part 10 (in the case of "Yes"), the program proceeds to step S5, and then keeps receiving "status" codes transmitted from the remocon.

Meanwhile, if the status codes showing the washing process status are given off from the first radio transmitting part 27 of the washer main body 200, the status codes are received by the second radio receiving part 27 of remocon and then are loaded into the second microcomputer 20 for the second microcomputer 20 to control the next stage of operations.

The next stage of operations are started at step S6, and the step S6 updates the power source adjusting part 21, the second display part 24, and an alarm part 23. The step S7 judges whether or not the status codes are keyed in.

Based on the judgement result from the key-in status codes, if the status codes are keyed in (in the case of "Yes"), the program proceeds directly to step S10, and returns back to step S6 after transmitting the key codes to the washer main body 200 by way of the second key part 22.

If the status codes are not keyed in (in the case of "No"), the program proceeds to step S8 and, for the moment, judges whether or not radio frequencies are matched (if the input condition of data is satisfied).

If the judgement result shows that radio frequencies are synchronized (in the case of "Yes"), step S9 is caused to receive the data and if not synchronized (in the case of "No") the program returns back to step S6 and repeats the next stage of operations.

FIG. 7*b* is a flow chart illustrating operational procedures of the radio receiving part for a washer main body 200 in accordance with the present invention.

First of all, step S1 judges whether or not radio receiving part 10 of the washer main body 200 has received the "start" codes after the start codes are transmitted from the second radio transmitting part 26 of the remocon.

If not received (in the case of "No"), the program proceeds directly to S4, and if received (in the case of "Yes"), proceeds to step S2 judges what status of changes have arisen during the washing process of the washer.

If the judgement result shows that there have been changes in the washer status (in the case of "Yes"), the program at step S3 transmits the "status" codes to the second radio receiving part 27 of the remocon, and if there have been no changes (in the case of "No"), judgement is made on whether or not the start code is synchronized at step S4.

If the judgement result at the step S4 shows that the start code is synchronized (in the case of "Yes"), which implies that receipt preparation is completed, the program proceeds to step S5, receives the key code, and performs the washing operations.

If not synchronized (in the case of "No"), as it is the status of no data transmission from the remocon, the program proceeds directly to step S6, performs the washing operations, and then returns back to step S1 and repeats the next stage of operations.

As explained in the above, the control apparatus and control method of a washer in accordance with the present invention is that as the washer is controlled by the use of a remocon, prompt counter measures are possible when there arises any discrepancy, maintaining long durability of the washer.

Further advantage of the present invention is that washing efficiency can be enhanced as the wrong operation resulting from mutual interference is prevented by the use of an EEPROM.

What is claimed is:

1. A control apparatus for washers having a main body and a remocon comprising:

first and second microcomputers;

first and second key parts which input into said first and second microcomputers data necessary for the operation of the washer main body and the remocon;

first and second display parts which indicate status of a washing process controlled by said first and second microcomputers;

an alarm part which gives off warning sound when malfunctions arise during the washing process;

first and second memories which store codes established for respective washers;

first and second radio transmitting parts which modulate into RF signals and output digital data coming from said first and second microcomputers;

first and second radio receiving parts which demodulate the RF signals outputted from said first and second radio transmitting parts, and then input said RF signals onto said first and second microcomputers;

power source adjusting part which controls a power supply of said second transmitting part and said second receiving part.

2. The apparatus of claim 1, wherein said power source adjusting part performs switching functions for supplying power only when said second radio transmitting part and said second radio receiving part are operated.

3. A control method of a washer comprising the steps of:

turning on a power source of a radio transceiver in a remocon;

reading secret codes stored in a second memory;

transmitting start codes from a remocon;

transmitting status codes to the remocon so that the status codes can be received when a washer main body receives the start codes from said remocon;

starting operation of a power source adjusting part of the remocon, a second display part and an alarm part;

causing the remocon to transmit key codes for the washer main body to receive;

receiving key codes only when synchronized after a discrimination is made on whether or not RF signals between the remocon and the washer main body are synchronized;

transmitting information generated according to the operation of the washer from the washer main body to the remocon; and displaying operation status of said washer main body.

4. A control method of claim 3, wherein the step of reading the secret codes comprises discriminating whether or not intrinsic secret codes of the washer main body are matched.

5. A control method of claim 3, wherein the step of transmitting status codes comprises transmitting the status codes to the remocon only when the conditions of the washer are changed in the case of start codes being received.

6. A control method of claim 3, wherein the step of transmitting status codes comprises discriminating RF synchronization when the start codes are not received.

7. A control method of claim 3, wherein the step of receiving key codes comprises maintaining present operation when the RF signals are not synchronized.

* * * * *